United States Patent [19]
Erickson

[11] 3,811,246
[45] May 21, 1974

[54] CLOSED LOOP SYSTEM FOR THE ELIMINATION OF FLUORINE POLLUTION FROM PHOSPHORIC PLANTS

[76] Inventor: William R. Erickson, P.O. Dwr. 1496, Bartow, Fla. 33830

[22] Filed: Jan. 16, 1973

[21] Appl. No.: 324,227

[52] U.S. Cl.................. 55/71, 423/483, 423/488
[51] Int. Cl............................................ B01d 53/00
[58] Field of Search ........... 55/71, 84, 55; 423/240, 423/304, 483-485, 488

[56] References Cited
UNITED STATES PATENTS

| | | | |
|---|---|---|---|
| 3,091,513 | 5/1963 | Parish | 423/483 |
| 3,286,442 | 11/1966 | Wylegala | 55/71 |
| 3,415,039 | 12/1968 | Rushton et al. | 55/84 |
| 3,512,341 | 5/1970 | English | 55/71 |

Primary Examiner—Charles N. Hart
Attorney, Agent, or Firm—Cushman, Darby & Cushman

[57] ABSTRACT

A process for recovering fluorine compounds from the evaporative concentration of aqueous phosphoric acid, without atmospheric pollution, is disclosed, wherein the vapors produced by concentrating aqueous phosphoric acid solution are condensed by contacting same in a system closed to the atmosphere with an aqueous fluorine-compound-absorbing liquid, with said aqueous liquid being cooled by indirect heat exchange and then recycled to condense additional vapors. The prior art required cooling water ponds or the like and such ponds are eliminated by the present process, with the consequential elimination of fluorine pollution of the atmosphere.

7 Claims, 2 Drawing Figures

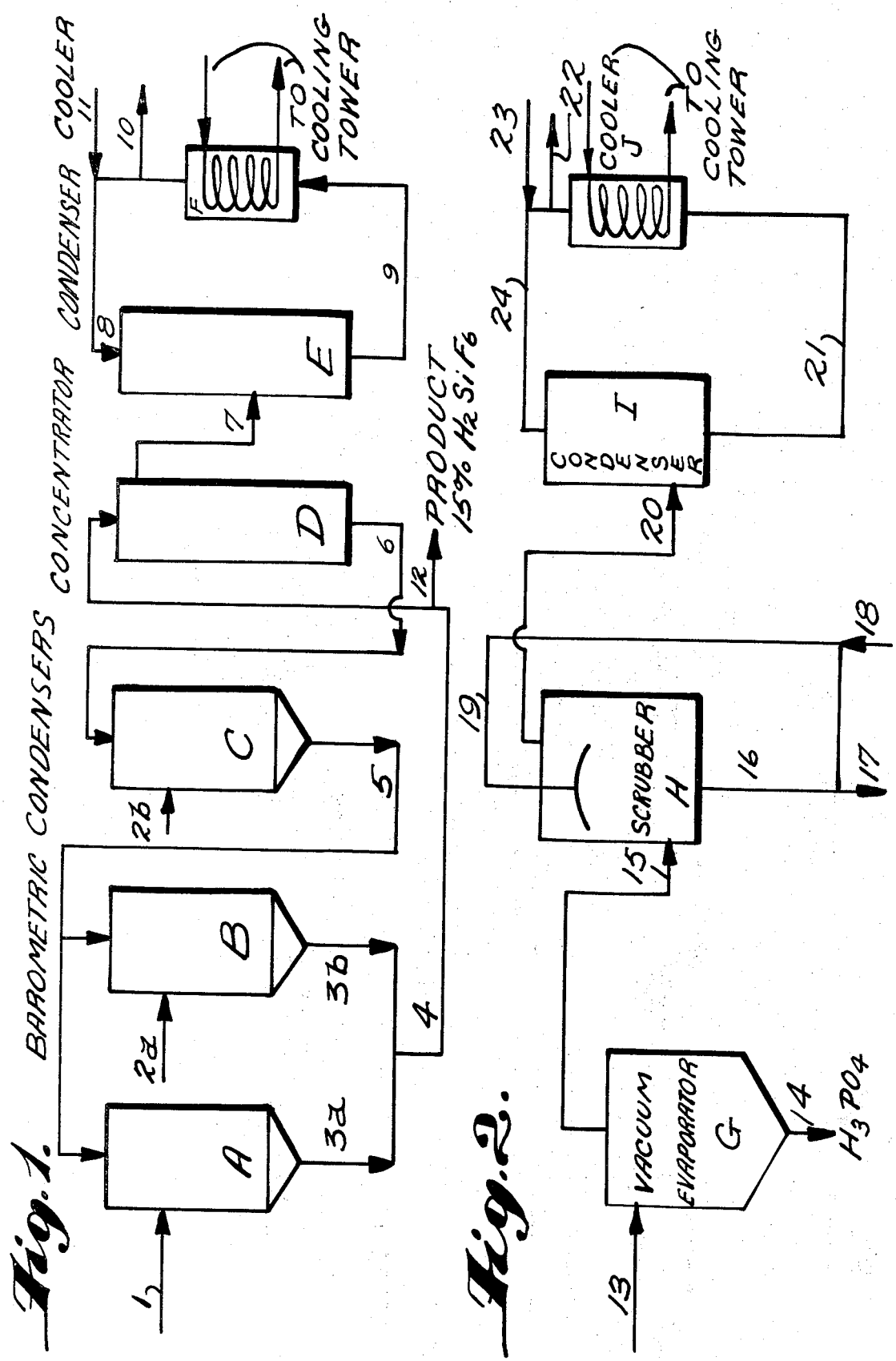

CLOSED LOOP SYSTEM FOR THE ELIMINATION OF FLUORINE POLLUTION FROM PHOSPHORIC PLANTS

BACKGROUND OF THE INVENTION

The present invention is directed to the elimination of fluorine emission from the evaporator operation of phosphoric acid plants.

In the manufacture of superphosphates, phosphate rock is treated with a mineral acid such as, for instance, sulfuric acid, to dissolve certain inorganic materials, including phosphate, therein to form a relatively dilute phosphoric acid solution. This dilute phosphoric acid solution also contains minor amounts of fluorine together with certain other materials. In order to be readily utilized, the phosphoric acid solution must be concentrated, and such concentration is normally accomplished in a vacuum evaporation step, wherein the relatively dilute solution is subjected to elevated temperatures and reduced pressure. Water vapor is volatilized together with some of the fluorine compounds, with the fluorine compounds probably being in the form of $SiF_4$ and $HF$, to concentrate the phosphoric acid solution.

The prior art has simply condensed the vapors from the vacuum evaporator with pond water in barometric condensers. The resulting dilute aqueous solution of fluorine compounds is sent to large cooling ponds, wherein the water in the pond cools by evaporation and is subsequently recycled to the barometric condensers.

In the condensation step, the pond water picks up the fluorine compounds contained in the vapors from the vacuum evaporator. When the pond water is returned to the cooling ponds, the fluorine is evolved, with a resulting fluorine vapor pollution problem. The fluorine level in the cooling ponds builds up to a level of about 5,000 to about 9,000 ppm, and at this level it is estimated that approximately 2 to 10 pounds of fluorine per day per acre of cooling pond surface is emitted. Normally the cooling water ponds in the phosphoric acid industry are 100 to 400 acres in size and the fluorine emission to the atmosphere is significant, exceeding the generally recognized maximum level of 40 pounds fluorine emission per day from the phosphoric acid plant.

Some phosphoric acid plants have installed fluorine recovery systems in an effort to reduce the fluorine emissions therefrom. Two different systems have become relatively popular in phosphoric acid plants, the Swenson system and the Swift system (or combinations of both).

The Swenson fluorine recovery system normally involves the use of a plurality of barometric condensers to totally condense the vapors from the phosphoric acid vacuum evaporator. The barometric condensers are normally operated at from about 2 to about 12 inches of mercury absolute pressure, and at temperatures of about 70° F. to about 140°F., and a solution of fluorosilicic acid is recovered. A portion of the fluorosilicic acid solution is removed as by-product fluorosilicic acid. However, the major portion of the fluorosilicic acid solution is recycled, after concentration and cooling, to the barometric condensers for condensing additional vapors from the vacuum evaporator. The concentration and cooling of fluorosilicic acid solution is normally conducted in a vacuum concentrator operated at a pressure of about 2½ to about 9 inches of mercury pressure. Water vapor evaporation cools the fluorosilicic acid solution to the desired temperature for use in the barometric condensers.

The vapors from the Swenson system vacuum concentrator are condensed by contacting same with pond water, and the pond water containing the condensed vapors is sent to cooling water ponds, as described above.

The Swift fluorine recovery system involves the use of a barometric condenser or scrubber wherein only a portion of the vacuum evaporator vapors are condensed. In the scrubber an aqueous liquid at about the same temperature as that of the vacuum evaporator vapors is used to contact such vapors. The fluorine compounds are dissolved in the aqueous liquid, without significant water vapor condensation. The liquid solution produced in the scrubber is an aqueous solution of fluorosilicic acid, part of which can be recovered as by-product, and part of which is normally recycled to the scrubber, preferably after the addition of make-up water, if required. The vapors from the scrubber are condensed in a barometric condenser by contact with a condensing liquid. This condensing liquid is conventionally pond water, with the resulting aqueous condensate solution being sent to cooling ponds.

The Swift and Swenson recovery systems still have the decided disadvantage that cooling ponds are still required. Some of the fluorine concentration still builds up to the level of 5,000 to 9,000 ppm, and thus plants utilizing the Swenson and/or Swift recovery systems still have substantially the same fluorine emission rates as plants without such recovery units.

The Swift recovery system is described in U.S. Pat. No. 3,091,513, the disclosure of which is hereby incorporated by reference.

SUMMARY OF THE INVENTION

The present invention relates to an improved process for recovering fluorine compounds which are produced as by-products in the evaporative concentration of aqueous phosphoric acid. The fluorine compounds are recovered according to the present process without significant atmospheric pollution, which atmospheric pollution is a problem with conventional aqueous phosphoric acid concentration processes. The vapors produced by concentrating the phosphoric acid solution are condensed by contacting same in a system which is closed to the atmosphere with an aqueous fluorine-compound-absorbing liquid. The aqueous liquid, containing condensed vapors, is cooled by indirect heat exchange and then recycled to condense additional vapors, with cooling water ponds and the like being eliminated by the process of the present invention.

DESCRIPTION OF THE INVENTION

The present invention is directed to the recovery of fluorine compounds from phosphoric acid evaporation operations, although the present invention may also be used to eliminate fluorine emissions from other operational steps in a phosphoric acid plant complex.

The process of the invention involves the use of a fluorosilicic acid recovery system, which may be, for instance, a Swift system, a Swenson system, or a combination of these two known fluorine recovery systems, in connection with a closed loop aqueous condensing system.

Basically, the process of the present invention involves condensing the vapors from phosphoric acid operations, especially from a phosphoric acid vacuum evaporator, by contacting the vapors in a condenser with an aqueous liquid which absorbs fluorine vapors. The aqueous liquid is at least 5°F. below the saturation vapor temperature of the water vapor and the fluorine vapors, at the pressure involved, so that the vapors condense. The contacting of the vapors with the aqueous liquid is in a system closed to the atmosphere, and the resulting condensate solution is cooled and at least a part thereof is then recycled in the closed system to the condenser. The cooling is by the indirect exchange of heat, with the condensate solution maintained in the closed system and isolated from the atmosphere. Conveniently, the condensate is passed through a heat exchanger or other indirect cooling apparatus, wherein it is cooled by water which is, in turn, cooled by passage through a cooling tower, although other methods may be used to cool the water or other cooling fluid as will be clear to those of ordinary skill in the art. By this procedure, the pollution of the atmosphere by fluorine vapors is completely eliminated.

When using a modified Swenson-type fluorosilicic acid recovery system, the vapors from the phosphoric acid vacuum condenser are condensed in a cooler by contacting with an aqueous liquid at a temperature of from about 70°F. to about 140°F., preferably about 95°F. to 115°F., to form a condensate solution of condensed vapors in said aqueous liquid. Then the condensate solution is concentrated in a vacuum concentrator at a temperature of about 90°F. to about 170°F., preferably about 100°F. to about 140°F., and at a pressure of about 2 inches of mercury to about 9 inches of mercury to produce a fluorosilicic acid solution. Preferably, the fluorosilicic acid solution contains at least 15 percent by weight of fluorosilicic acid. At least a portion of the fluorosilicic acid solution is recycled to the vacuum evaporator vapor condenser for use as a condensing fluid therein.

The vacuum concentration of the condensate solution also results in a vapor stream which comprises mainly water vapor as well as minor amounts of fluorine vapors. These vapors from the vacuum concentrator are totally condensed by contact with a second aqueous liquid in a closed loop system, i.e., in a system which is isolated from the atmosphere. The second aqueous liquid is at a temperature of at least 5°F. less than the saturation vapor pressure, preferably 5°–15°F. less than the saturation vapor pressure, and generally within the range of about 80°F. to about 100°F., and under a pressure of about 2.5 to about 3.0 inches of mercury.

The resulting solution of condensed vapors in the second aqueous liquid is cooled by indirect heat exchange while being maintained in the closed loop system isolated from the atmosphere, with at least partial recycling of the cooled solution. A portion of the cooled solution may be sent to the sulfuric acid dilution cooler, to partially supply the water requirement of such dilution cooler in the phosphoric acid plant operation, or to other areas of the phosphoric acid plant.

In another embodiment of the process of the present invention using a modified Swift system, the vapors from the aqueous phosphoric acid concentration are scrubbed with an aqueous liquid which is capable of absorbing fluorine compounds. This aqueous liquid is at an elevated temperature, such that substantially no water vapors are condensed in the scrubbing operation. Generally, the aqueous liquid is at substantially the same temperature as the temperature of the vapors. The aqueous solution of condensed vapors thus produced in the scrubbing operation generally contains at least 5 percent by weight of fluorosilicic acid.

The scrubbed vapors passing through the scrubber are totally condensed in a condenser by contacting same, generally in counter-current flow, with a second aqueous liquid which is at a temperature below the saturation vapor temperature of the vapors, and preferably at a temperature at least 10°–20°F. less than the temperature of the vapors, generally about 50° to 90°F. The resulting condensate contains substantially all the water vapors that were present in the scrubbed vapors, and this condensate is cooled by indirect heat exchange while maintained in the closed loop system and isolated from the atmosphere. Generally, the condensate is cooled to substantially the temperature of the second aqueous liquid and at least part of the cooled condensate is recycled to the condenser as the second aqueous liquid. A portion of the condensate may be removed from the closed loop system and sent, e.g., to the phosphoric acid dilution cooler, as described above, either before or after, preferably after, being cooled by the indirect heat exchange.

DESCRIPTION OF THE DRAWINGS

The process of the present invention will be more clearly understood with reference to the accompanying drawings, wherein:

FIG. 1 is a schematic flow diagram of a modified Swenson process for recovering fluorine compounds from the vapors from an aqueous phosphoric acid concentration, and FIG. 2 is a schematic flow diagram of a modified Swift process for recovering fluorine compounds from the vapors from an aqueous phosphoric acid concentration.

In FIG. 1, the vapors from the aqueous phosphoric acid concentrator (not shown) are introduced via lines 1, 2a and 2b, into barometric condensers A, B, and C, respectively. The condensate from barometric condensers A and B is discharged through lines 3a and 3b, which are combined as line 4 and sent to concentrator D. The concentrated solution formed in concentrator D is recycled via line 6 to barometric condenser C wherein vapors introduced through line 2b are condensed and that resulting condensate is supplied via line 5 to barometric condensers A and B to condense vapors therein.

Less or more barometric condensers may be utilized, and the three barometric condensers may even be replaced by a single barometric condenser, but the above described use of three barometric condensers has been found to be particularly effective. The barometric condensers are generally at a temperature of about 70°F. to about 140°F. and a pressure of about 12 inches to about 2 inches of mercury. When using the three barometric condensers as described in FIG. 1, barometric condenser A is preferably at a temperature of 155°–160°F. and a pressure of about 9 inches of mercury, barometric condenser B is preferably at a temperature of about 145°–150°F. and a pressure of about 7 inches of mercury, and barometric condenser C is preferably at a temperature of 110°–120°F., and a pressure of about 3 inches mercury absolute.

The concentrated solution in line 6 is at a temperature of below the saturation vapor temperature of vapors in line 2b and generally the temperature of the solution in line 6 will be from about 80°F. to about 120°F. or so. The temperature of the barometric condenser C condensate in line 5 is below the saturation vapor temperature of vapors in barometric condensers A and B and preferably is about 90°F. to about 130°F., more preferably about 110°F. The temperatures of the barometric condensers A and B condensate in line 4 is generally about 120°F. to about 160°F., preferably about 140°F. This condensate solution in line 4 is concentrated in concentrator D by the vacuum evaporation of water therefrom, with the concentrator operated at a pressure of about 2½ to about 9 inches of mercury.

Generally, the evaporation of water vapors cools the condensate in the concentrator by about 20°–50°F., e.g., from a temperature of 140°F to a temperature of 100°F.

Product fluorosilicic acid may be removed from line 4 or from line 6, and FIG. 1 illustrates the removal of 15 percent fluorosilicic acid product from line 4 via line 12.

In FIG. 2, an aqueous phosphoric acid solution from a phosphoric acid plant, not shown, is introduced, generally at a temperature of 80° – 180°F., especially about 100°–120°F., via line 13, into a vacuum evaporator G. The phosphoric acid solution in line 13 generally has a concentration of about 28–32% $P_2O_5$, and this phosphoric acid concentration is raised to about 50–55% $P_2O_5$ by removal of water, in the form of water vapor, in the vaccum evaporator G, which is generally operated under a vacuum of 2–11 inches Hg. The temperature in the vacuum evaporator is generally about 175°–190°F. Product phosphoric acid is discharged through line 14, and water vapors, generally containing fluorine compounds, such as HF and $SiF_4$, are removed by line 15 and supplied to scrubber H. In scrubber H, the vapors are contacted by a countercurrent flow of an aqueous liquid which is substantially at the same temperature as the vapors (i.e., about 175°–190°F). The fluorine compounds are generally dissolved in the aqueous liquid without significant water vapor condensation. The aqueous liquid, with fluorine compounds contained therein, is withdrawn from scrubber H by way of line 16. By-product fluorosilicic acid is discharged via line 17, either intermittently or otherwise, with the remainder of the solution in line 16 recycled to scrubber H via line 19. Makeup water is added via line 18 to compensate for the removal of by-product fluorosilicic acid solution through line 17.

The scrubbed vapors from scrubber H pass via line 20 into condenser I, wherein the vapors are totally condensed by an aqueous condensing liquid. The solution of condensed vapors is withdrawn from condenser I by way of line 21, and cooled in cooler J by indirect heat exchange with a cooling liquid which is, in turn, cooled in a cooling tower (not shown). If desired, a portion of the cooled condensate may be removed via line 22 and sent to the phosphoric acid dilution cooler. Makeup water is added, via line 23, to the remainder of the cooled condensate, which is then recycled via line 24 to condenser I. The solution in line 24 is generally at a temperature of 60°–95°F. The solution in line 21 is generally at a temperature of 80°–140°F. The cooling liquid, generally water, in cooler J generally is at a temperature at least 10°F less than the temperature of the solution in line 21, preferably at least 20°F less than the temperature of the solution. Generally the condenser and the scrubber will be operated at a pressure of about 2–11 inches Hg, preferably at about 9 mmHg. The condenser I, lines 21 and 24, and cooler J form a closed loop system which is isolated from the atmosphere.

EXAMPLE OF THE INVENTION

This example relates to the use of a modified Swenson system, as set forth in FIG. 1 of the accompanying drawings (reference to various flow streams and apparatus will be with reference to FIG. 1).

28,880 pounds/hour of vapors from a phosphoric plant evaporator, having a temperature of about 188°F., were introduced into barometric condenser A which was operated at a pressure of 9 inches of mercury absolute and a temperature of 157°F. 1,450 gpm of fluorosilicic acid solution having a temperature of 110°F. were supplied to the top of barometric condenser A by line 5. The condensate solution discharged from barometric condenser A had a temperature of 145°F. 24,960 pounds/hour of vapors from a second phosphoric plant evaporator (having a temperature of about 188°F.) were introduced via line 2a into barometric condenser B which was operated at a pressure of 7 inches of mercury absolute and a temperature of 147°F. 1,550 gpm of fluorosilicic acid at a temperature of 110°F. were supplied to the top of barometric condenser B by line 5. The condensate solution was discharged from barometric condenser B at a temperature of 138°F. and was combined with the condensate solution from barometric condenser A, with the combined condensate solution, amounting to 3,000 gpm, having a temperature of 141°F. 13,700 pounds/hour of vapors from a third phosphoric plant evaporator (having a temperature of about 188°F.) were supplied via line 2b to barometric condenser C, wherein these vapors were totally condensed by contact with 3,000 gpm of fluorosilicic acid having a temperature of 101°F. supplied by line 6. The resulting condensate solution, in an amount of about 3,000 gpm, had a temperature of 110°F., and was discharged from barometric condenser C through line 5.

The fluorosilicic acid solution in line 4 was supplied to vacuum concentrator D, wherein the flashing of water vapor at a pressure of 3 inches of mercury absolute reduced the temperature of the solution from 141°F. to 101°F. About 3,000 gpm were discharged from vacuum concentrator D through line 6 at the aforesaid temperature of 101°F. The vapors from vacuum concentrator D were supplied through line 7 to condenser E wherein the vapors were totally condensed by contact with 2,800 gpm of fluorosilicic acid solution having a temperature of 91°F. and a volume of 2,913 gpm. This condensate solution was supplied via line 9 to an indirect heat exchanger F., wherein the condensate solution was cooled to 91°F. in a tube and shell heat exchanger with 86°F. water from a cooling tower. 161 gpm of fluorosilicic acid solution was supplied to the phosphoric acid dilution cooler of the phosphoric acid plant through line 10. 48 gpm of make-up water were supplied through line 11, with the resulting fluorosilicic acid solution recycled to condenser E. The water used to cool in heat exchanger F was in turn cooled to 86°F. in a cooling tower and reused.

11,810 pounds/hour or 23.7 gpm of 15 percent fluorosilicic acid product was discharged from the system through line 12.

No atmospheric pollution occurred during the operation of this process.

What is claimed is:

1. A process for the recovery of fluorine compounds from vapors containing water vapor and fluorine compounds, mainly in the form of HF and $SiF_4$, produced by the concentration of aqueous phosphoric acid, while eliminating fluorine atmospheric pollution, said process comprising condensing said vapors in a condenser by contacting same in a closed loop system with an aqueous fluorine-compound-absorbing liquid at a temperature below the saturation vapor temperature, to produce a condensate of said aqueous liquid and condensed vapor, with cooling of said condensate to said temperature and recycling at least part of the cooled condensate to the condenser, wherein the cooling of said condensate is by indirect heat exchange while maintaining said condensate in said closed loop system isolated from the atmosphere, whereby atmospheric pollution is avoided.

2. A process for recovering fluorine compounds from vapors containing water vapor and fluorine compounds as claimed in claim 1, said process comprising:
   a. condensing said vapors by contacting same in at least one condenser with an aqueous liquid at a temperature of about 70°F. to about 140°F., to form a condensate of said aqueous liquid and condensed vapors,
   b. thereafter concentrating the condensate by vacuum concentration, at a temperature of about 90°F. to about 170°F. and at a pressure of about 2 inches of mercury to about 9 inches of mercury, to produce a fluorosilicic acid solution containing at least 15 percent by weight of fluorosilicic acid, and vapors containing mainly water vapor,
   c. recycling at least a portion of said fluorosilicic acid solution to the condenser of step (a), and
   d. condensing the vapors from said vacuum concentration by contacting same with a second aqueous liquid in a closed loop system isolated from the atmosphere, said second aqueous liquid being at a temperature of about 80°F. to about 100°F., with cooling and at least partial recycling of said aqueous liquid, wherein the cooling is by indirect heat exchange while maintaining said aqueous liquid in said closed loop system isolated from the atmosphere, whereby atmospheric pollution is avoided.

3. Process as claimed in claim 2, wherein the vapors are condensed in step (a) in a plurality of condensers.

4. Process as claimed in claim 2, wherein the second aqueous liquid of step (d) is at a temperature of about 90°F.

5. A process for the recovery of fluorine compounds from vapors containing water vapor and fluorine compounds as claimed in claim 1, said process comprising:

scrubbing said vapors with an aqueous fluorine-compound-absorbing liquid at an elevated temperature which is substantially the temperature of said vapors, said aqueous fluorine-compound-absorbing liquid being capable of absorbing said HF and $SiF_4$ to form a fluorosilicic acid solution having a concentration of at least 15 percent by weight, while substantially avoiding the condensation of water vapor, to produce a solution of fluorosilicic acid in said aqueous fluorine-compound-absorbing liquid, and condensing the vapors from said scrubber in a condenser by contacting same with a second aqueous liquid at a temperature at least 20°F. less than the temperature of said vapors and below the saturation vapor temperature of said vapors to produce a condensate containing substantially all water vapor in said vapors, with cooling and recycling of said condensate, wherein the cooling is by indirect heat exchange while maintaining said condensate in said closed loop system isolated from the atmosphere, whereby fluorine vapor atmospheric pollution is eliminated.

6. Process as claimed in claim 5, wherein said vapors from the aqueous phosphoric acid concentration are at a temperature of about 126°F. to about 180°F.

7. Process as claimed in claim 5, wherein said second aqueous liquid has a temperature of less than 100°F.

* * * * *